Feb. 4, 1936. J. F. WILLIAMS 2,030,023
CUTTING AND ABRADING MACHINE AND PROCESS
Filed March 5, 1927 2 Sheets-Sheet 1

INVENTOR:
JAMES F. WILLIAMS,
BY
HIS ATTORNEY.

Feb. 4, 1936.  J. F. WILLIAMS  2,030,023
CUTTING AND ABRADING MACHINE AND PROCESS
Filed March 5, 1927  2 Sheets-Sheet 2
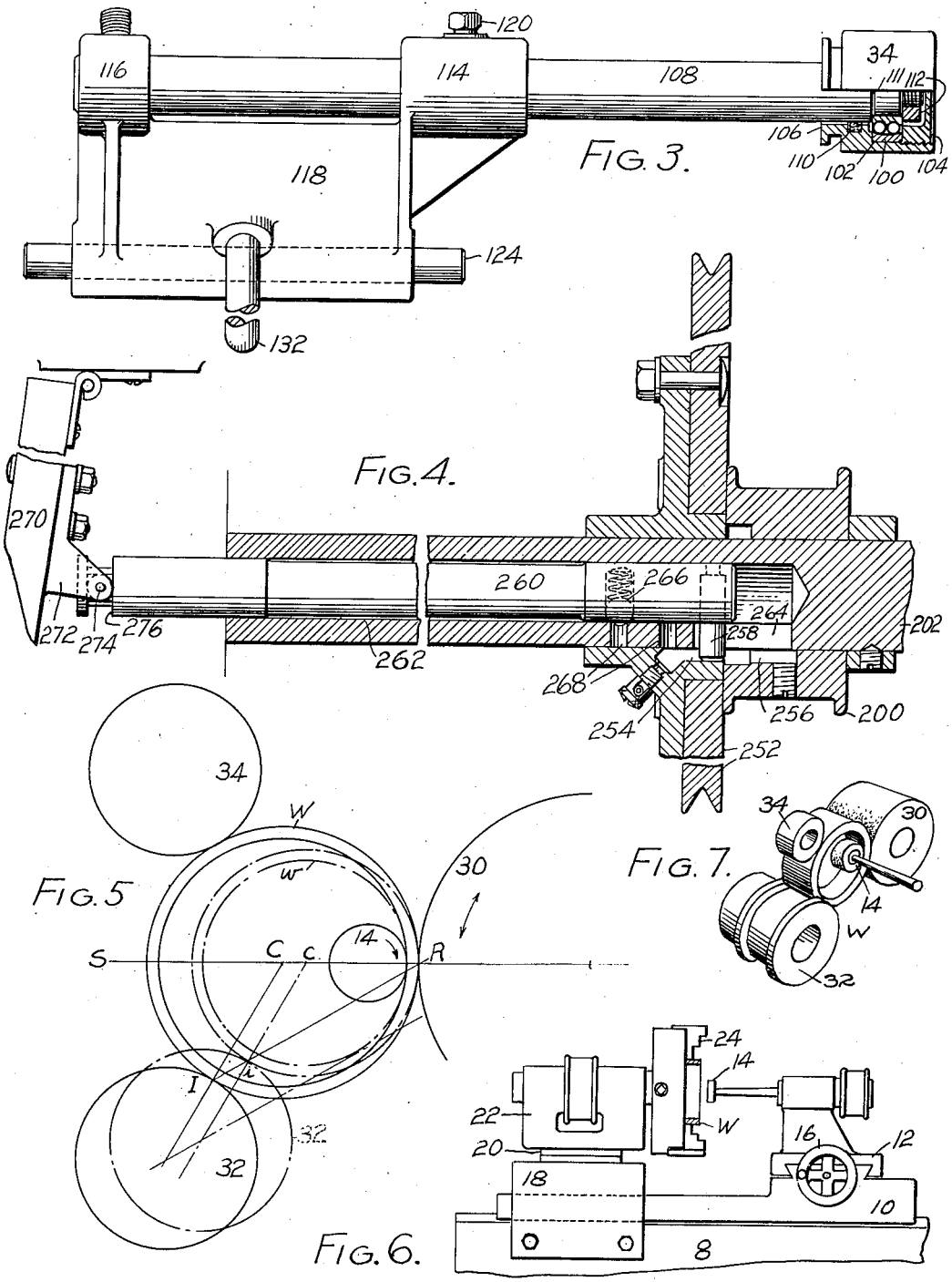
INVENTOR:
JAMES F. WILLIAMS,
BY
HIS ATTORNEY.

Patented Feb. 4, 1936

2,030,023

UNITED STATES PATENT OFFICE 2,030,023

CUTTING AND ABRADING MACHINE AND PROCESS

James F. Williams, Niagara Falls, Ontario, Canada, assignor to General Motors Corporation, Detroit, Mich., a corporation of Delaware Application March 5, 1927, Serial No. 173,057

47 Claims. (Cl. 51—103)

This invention relates to machines and processes for cutting and abrading and the like and comprises all the features of novelty herein disclosed, by way of example, in connection with a chuckless internal grinding machine.

According to prior practice in internal grinding of sleeves and rings which require accurate sizing to very small limits, the sleeve or ring to be ground is clamped in a chuck, suitably carried by a rotary shaft or spindle; this secures rotation of the work piece while a grinding wheel is applied to its bore. Errors of centering the work, which are inherent in a chuck, result in the producing of a finished wall of varying thickness. The chuck clamping fingers frequently support the piece externally at only portions of the periphery and grinding wheel pressure causes distortion of the piece, especially when the wall is thin. When the work is clamped in a chuck, it is difficult to dissipate the heat generated by grinding, resulting in increased grinding time and uncertainty of dimensions due to expansion and contraction. Considerable care and skill is needed in chucking each work piece so that its axis will aline precisely with the axis of rotation of the chuck-carrying shaft; and furthermore, much valuable time is lost by the need for bringing such chuck and its shaft to a full stop for the unchucking of each finished work piece, and for the loading or chucking of each new or unground work piece. Such chucking and unchucking by the machine operator involves always the manipulation of the work pieces in an axial direction, bringing the operator's hands into dangerous proximity to the high speed rotating grinding wheel, and necessitating, in such chuck type internal grinding machines the use of guards or other complications to protect the operator against injury. Furthermore, once a work piece has been removed from the chuck, it is practically impossible to replace it accurately in the chuck for further grinding.

An object of the invention, accordingly, is to provide an improved machine for correcting or eliminating these and other difficulties or any of them. Another object is to provide an improved machine for grinding or finishing workpieces with great accuracy and at low cost. Another object is to provide a machine of this character in which the work can be readily located without special skill. Still another object is to provide a machine in which the work is better exposed to cooling and other treatment, and in which the work is better supported against grinding wheel pressure.

Still another object is to produce work of uniform wall thickness.

A particular object is to provide a machine in which the work pieces can be readily and accurately dropped into accurate grinding position, and as readily removed therefrom after the grinding operation thereon,—all without any need for stopping or slowing down the work-rotating instrumentalities, or for exposing the operator, in his manipulations of the work pieces, to the danger of contact with the rotating grinding wheel; also, to provide such work-rotating instrumentalities in a form that permits accurate repositioning of a work piece, in the event that it is found to require additional grinding.

To these ends and also to improve generally upon devices of the character indicated the invention consists in the various matters hereinafter described and claimed.

The invention, in its broader aspects, is not necessarily limited to the particular embodiment selected for illustration in the accompanying drawings in which Figure 1 is a plan view of the work head, some parts being in section and some removed for clearness;

Figure 3 is a detail view of one of the idler wheels and a portion of its support, with some parts in section;

Figure 4 is a section of a countershaft and associated mechanism;

Figure 5 is a diagrammatic view of certain important elements, illustrating their relation to a work-piece which is being internally ground;

Figure 6 is a view, largely diagrammatic in character, of a machine of the prior art; and Figure 7 is a perspective view of the wheels and work.

Figure 1:
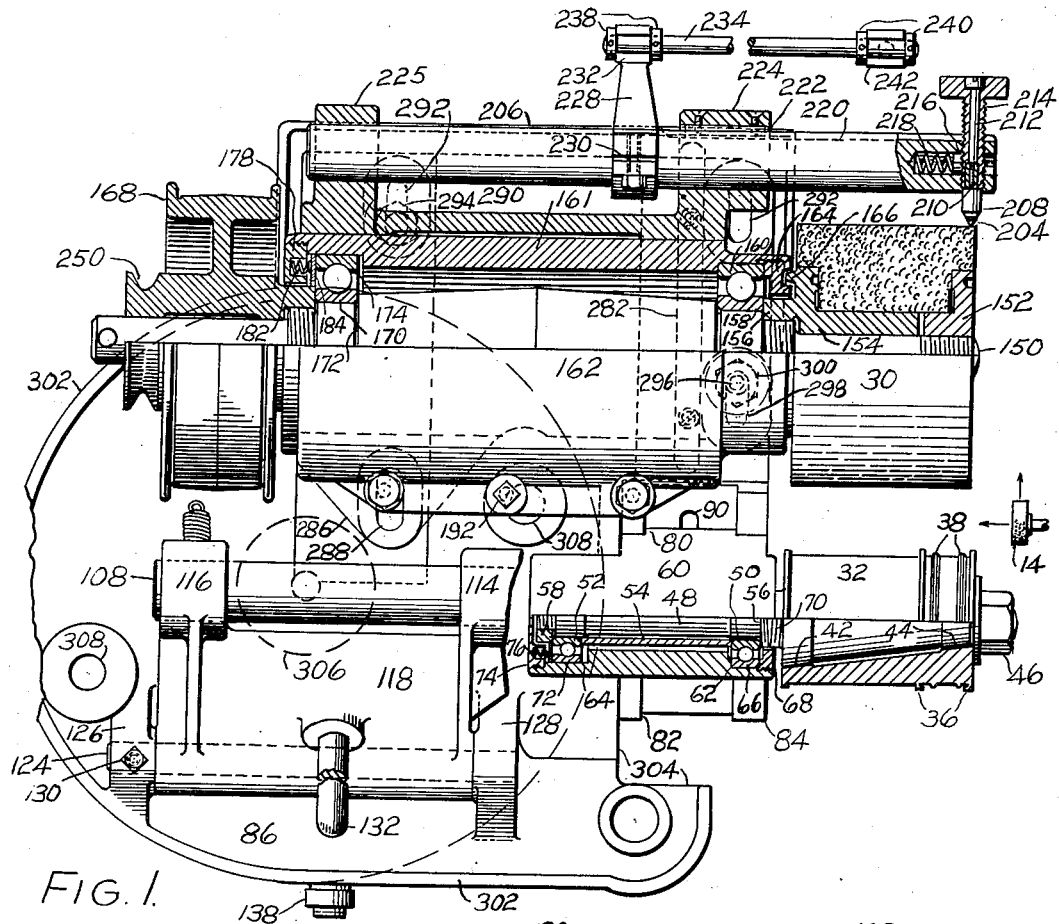
Figure 2:
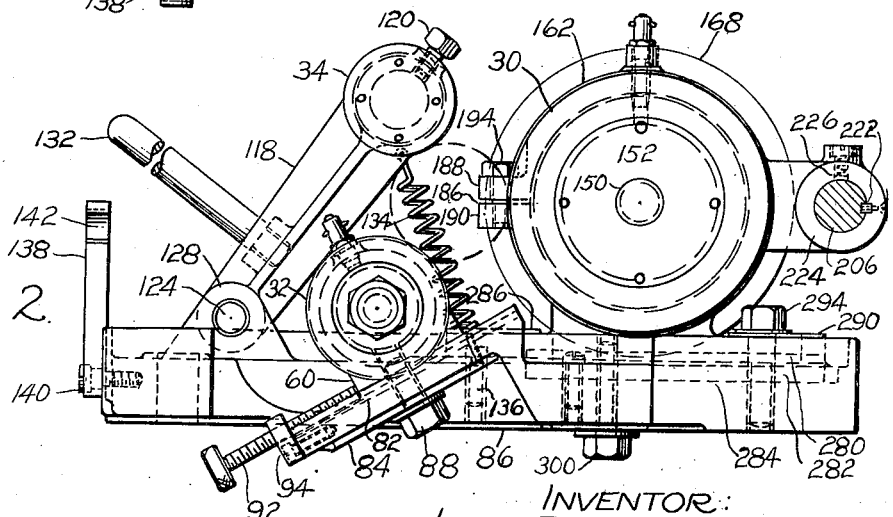
Figure 2 is an end elevation with part of the truing mechanism in section.

A brief reference will first be made to prior machines for internal grinding with chucks. In Figure 6, the numeral 8 indicates the frame of an internal grinder having a longitudinally reciprocating table 10 supporting a wheel carriage 12 and grinding wheel 14 fed crosswise of the table as by a screw controlled by a hand wheel 16. On a bridge 18 which straddles the carriage is fastened a base plate 20 carrying a work head 22. The work head carries a chuck 24 for holding and rotating at a uniform rate a hollow work piece W to be ground internally, such work-piece having been commonly first exteriorly finished round upon the old and well-known so-called "centerless" grinder which typically has a rest upon which the work-piece is rotatably peripherally supported while engaged between rotating wheels, one of which rotates relatively slowly to control the rotation of the work-piece while the other rotates rapidly to grind such work-piece's surface. Both such "centerless" grinders and such internal grinders as indicated in Figure 6 are old and well-known in the art. In such internal grinders automatic longitudinal reciprocation is given their tables 10 by suitable well-known power mechanism whose reversing means are controlled by parts struck by some member carried by the table as the latter completes its movement in either direction, it being possible to throw such striking means out of striking position when desired, so that, although the rotating grinding wheel 14 is automatically reciprocated back and forth across the work piece as long as desired to effect the grinding, upon so throwing out the striking part at the completion of the grinding the table 10 is not reversed at the end of its usual travel toward the right as the parts are shown in Figure 6 but continues to move in that same direction until the grinding wheel is withdrawn to a position of rest remote from the work piece so that the ground work piece can be removed from the chuck and a new work piece can be inserted in the latter, after which the table-reciprocating parts are again started and, the above-mentioned striking-parts being again in position to effect reversals, the grinding wheel is fed into the new work piece and successively reversed to traverse back and forth across it until the grinding is completed, whereupon, the appropriate striking-part being again thrown out, the grinding wheel backs out of the work piece to its remote position of rest. In some of these old machines the striking part can not only be thrown out by hand but is operated through the instrumentality of a gauge whose movement is controlled by the wearing away of the work piece during grinding. Also, in these old machines the above-mentioned fine-thread screw that causes the cross-feed of the carriage 12 and its grinding wheel 14 is commonly operable not only by the hand wheel 16 but also by a pawl that acts upon a ratchet connected to the screw and is automatically moved as the table 10 reciprocates, so that gradual step-by-step feed of the grinding wheel occurs automatically. Well-known shield mechanisms are commonly provided to stop such cross-feeding at any desired point, and there are also means for automatically retracting the grinding wheel crosswise and resetting its pawl-and-ratchet mechanism after the completion of the grinding, such movements being frequently automatically controlled through the instrumentality of such gauges as above mentioned. All of this is old and well known.

According to the present invention, the work-piece W, such as a sleeve or ring which is exteriorly finished, preferably as above described, is supported and rotated by a series of work positioning means preferably in the form of rotary wheels, one of which is positively driven to control the speed of rotation and furnish a backing for the work and the others being idlers. The wheel 30 is herein shown as the driven, control or backing wheel and is preferably, but not necessarily, a cast iron wheel or a wheel with an abrasive surface. Its speed is sufficient to impart to the work a speed approximately that usual to chucks. There is also a supporting idler wheel 32 and a pressure applying idler wheel 34, the wheels 30 and 32 having their axes in the same plane and, when cylindrical as shown, they are also precisely parallel. Any one or more of the wheels may be driven. If the wheel 30 is not driven, one of its remaining important functions is to furnish a backing for the work to cooperate with an opposed grinding wheel to size the work accurately.

The work supporting idler wheel 32 carries flanges 36 to guide the ends of the work-piece and has peripheral ribs or rails 38, raised above the body of the wheel, to engage the periphery of the work-piece. The rails are accurately machined true with the wheel axis and support the work at two places near the ends, being thereby intended to guard against improper position of the work-piece due to a possible slight crowning of its exterior surface and to minimize errors of position caused by foreign matter getting between the work and the body of the wheel. A scraper or revolving brush may be used further to insure a clean guiding surface. The idler wheel 32 is interiorly coned as at 42 and 44 and is clamped detachably by a nut 46 against correspondingly spaced coned surfaces on a spindle 48. To take care of work of different lengths and diameters a series of idler wheels having properly spaced guide flanges and rails is provided for the machine and the proper wheel selected for the work in hand. The spindle is mounted on ball bearings to run without play on an unvarying axis. Inner race rings 50 and 52 spaced by a sleeve 54 are clamped to the spindle between a shoulder 56 and a nut 58. The bearings are housed in a head or housing 60 having end recesses 62 and 64, the recess 62 having the outer race ring 66 of a ball bearing clamped in it by a ring nut 68. The ring nut has a smooth bore loosely surrounding right and left threads 70 on the spindle, the threads tending to keep grit out and oil in the housing. The recess 64 receives an outer race ring 72 with a sliding fit. The end of the housing or head is closed by a nut 74 having a series of recesses for coil springs 76 which continually press against a washer abutting against the outer race ring 72 to take up play in the bearings. Grease is admitted to the head through an alemite fitting.

The head 60 is slidably adjustable along an incline. At the bottom, it has a tongue 80 fitting in an inclined slideway 82 in an extension 84 of a base plate 86. The sliding head can be clamped in adjusted position by a screw bolt 88 passing upwardly through a slot 90 in the extension and threaded in a tapped opening in the bottom of the head. The head is adjusted in the slideway by a hand screw 92 threaded in a bracket plate 94 fastened to the front of the extension 84. The screw abuts against the head, affording means to force it up the incline or let it slide down by gravity when the clamping bolt is loosened. The inclination of the slideway has a certain relation to the work and the wheels as will later appear.

The pressure applying idler wheel 34, shown in detail in Figure 3, turns upon a double row self-aligning ball bearing 100. The idler wheel is hollow with a recess 102 forming a shoulder against which the outer race ring of the bearing is clamped by a nut 104. A portion 106 of the wheel surrounds a shaft 108 with a slight clearance, a rubber washer 110 making a close joint with the shaft while allowing some adjustment of the wheel for misalignment. The shaft 108 has a shoulder 111 against which the inner race ring of the bearing is clamped by a nut 112 threaded on the reduced end of the shaft and received in a recess of the nut 104. The shaft is adjustably mounted in bearings 114 and 116 on a swinging arm or bracket 118, the bearing 114 having a set screw 120 to clamp the shaft in a position to bring the idler wheel opposite the center of the work-piece. The swinging arm or bracket 118 is pivotally mounted on a shaft 124 supported in lugs 126 and 128 on the base plate, the shaft being fixed by a set screw 130. A handle 132 on the swinging arm serves as a convenient means to swing it outwardly against the tension of a coil spring 134 fixed to the arm and to a stud 136 on the base plate. To hold the arm in swung-out position, as when inserting a piece of work, a latch 138 is pivoted on the base plate at 140 and has a lateral notch or fork 142 to straddle and hold the handle.

The control or backing wheel 30 is preferably a cast iron wheel or an abrasive wheel held on a spindle 150 by clamping plates 152 and 154 threaded on the spindle, the plate 154 having an extension 156 abutting against and clamping the inner race ring 158 of a ball bearing against a shoulder of the spindle. The outer race ring 160 of the bearing is clamped in a recess of a sleeve 161 in a housing or head 162 by a ring nut 164 which has an annular recess cooperating with a flange 166 on the plate 154 to trap grit and protect the spindle which must run true on an unvarying axis. A pulley 168 is threaded on the spindle and clamps an inner race ring 170 of a ball bearing against a shoulder 172. The outer race ring 174 of this ball bearing is mounted with a sliding fit in a recess of the sleeve. The recess is closed by a ring nut 178 surrounding a flange of the pulley and having a series of recesses for coil springs 182 which constantly press a washer 184 against the slidable race ring 174 to take up play in the bearings. The head or housing 162 is split longitudinally as at 186 where lugs 188 and 190 on the two edges are secured together by a pair of clamping screws 194 to hold the split head with the requisite tightness against the sleeve 161. A screw 192 is threaded in the upper lug 188 and abuts against the lower lug 190 to force open the housing so that, by loosening the clamping screws and removing the pulley, the bearing assembly of the control or backing wheel can be removed endwise through the split housing or head. The pulley 168 is driven by a belt from a pulley 200 on a countershaft 202 having several speeds, forward or back, so that the controlling wheel may be given any one of several speeds and be driven in either direction.

The control or backing wheel 30 is intended to do no grinding but wears away in time and must be trued occasionally to insure perfect work. It can be faced off by the grinding wheel but, to insure the requisite accuracy if an abrasive wheel is used, a diamond 204 is secured to a reciprocating rod 206 to carry the diamond across the wheel in a straight line parallel to the wheel axis. The diamond has a nib 208 with a reduced tapped extension 210 to receive the reduced threaded end of a clamping screw 212 in the bore of a hollow screw 214 which is threaded in a tapped opening bored through the reciprocating rod 206. The hollow screw is held from turning by a brass shoe 216 pressed against it by a coil spring 218 in a central bore of the rod. The rod has a key way 220 for a key 222 held by screws in a slot of a bearing 224 formed as an extension of the housing or head 162. A second bearing 225 for the rod insures straight line travel of the diamond. The bearings 224 and 225 are each bored for a spring pressed shoe 226 to prevent play. Inasmuch as the grinding wheel has a reciprocating table, it is convenient to operate the diamond and slide rod from some part of that table. To this end, a split bracket 228 can be secured in a selected position on the rod by a clamping screw 230, the free end of the bracket having an upwardly open fork 232 to straddle a bar 234 connected to the table. The bar 234 has two pairs of spaced collars, one pair 238 to embrace the fork 232 and another pair 240 to embrace a second fork 242 which has a shank which can be fastened to the table or some piece projecting from the table. The bar 234 is thus removable simply by lifting it.

When operating the diamond, the control or backing wheel spindle is run at high speed by a round belt engaging a groove 250 on the hub of the pulley 168, the belt extending to a grooved driving pulley 252 which can be clutched to the counter-shaft 202. As shown, either the pulley 252 or the pulley 200 may be selectively clutched to the countershaft. There are keyways 254 and 256 in the pulleys, and a key or pin 258, projecting radially from a sliding rod 260, is arranged to clutch either pulley to the counter-shaft. The countershaft has a round bore 262 for the rod to slide in and a slot 264 for the key or pin 258. To hold the rod in each of two extreme positions, a spring pressed ball 266 in a hole in the rod is arranged to snap into one or the other of two holes 268 in the countershaft. The rod is reciprocated by a lever 270 having a fork 272 with studs 274 entering a groove 276 in the rod.

The head or housing 162 is adjustable from front to rear on the base plate 86 in a manner always to keep the axis of the wheel 30 parallel to the axes of the idler wheels. The head has a keyway 280 in its bottom face slidably receiving a key 282 fastened by screws in a slot 284 of the base plate. The head has a front foot or extension 286 with a slot 288 and a rear foot or extension 290 with slots 292 for clamping bolts 294 which pass through the slots into tapped openings in the base plate. The head has additionally a tapped hole 296, and the base plate has a slot 298 for a fourth clamping bolt 300. The base plate has an upwardly extending edge flange or rib 302 for retaining spattered cooling liquid supplied for the grinding. The top face of the plate has a pitch to drain the liquid towards an interruption 304 in the flange where the liquid runs off into the main frame for further use. The base plate is normally so fixed that the axes of the work engaging wheels 30 and 32 are parallel to the axis of the grinding wheel and its line of reciprocation. Its bottom face is carefully machined to lie in a plane parallel to the plane of sliding of the grinding wheel carriage. The base plate is also capable of swivelling on the bridge 18 in case it is desired to grind a taper on a piece of work or to grind a bore with a curved cross section. To this end, the under side of the base plate has a central circular depression 306 to turn on a trunnion, and clamping bolts extend down through openings 308 and through arculate slots in the bridge 18 to clamp the plate in adjusted position for grinding a straight or a tapered bore.

In Figure 5 is represented diagrammatically the positions of certain important elements when grinding a hollow work-piece W internally. I preferably, but not necessarily, maintain the center of the work-piece W in the same plane with both the axis of the wheel 30 and the axis of the grinding wheel 14. This plane is indicated by the line R—S and the grinding wheel is fed radially of the work-piece, and radially of the wheel 30, so that it is always opposite the contact point R on the wheel 30. Maximum accuracy of sizing of the wall thickness is accordingly assured. When a work-piece of another size is to be ground and the same relation of contact points maintained it is important to have proper inclination and location of the slideway 82 which carries the supporting idler wheel 32. If C is the center of the large work-piece W and c the center of a smaller work-piece w, shown in broken lines, the contact point I of the idler wheel 32 is transferred to the point i when changing sizes. For geometric reasons, therefore, the slideway 82 here shown has an inclination equal to the angle CRI which is exactly half of the angle SCI or angle Sci. A condition is established making use of the theorem that the exterior angle of a triangle is equal to the sum of the opposite interior angles and in this case the triangles CRI and cRi are isosceles. In the practical operation of my machine it has been found that considerable variation is permissible in the location of the grinding wheel with respect to the plane containing the axes of the backing wheel and the work, where maximum uniformity of wall thickness and best finish is not essential.

In all such cases the backing wheel nevertheless provides substantial backing for the grinding wheel, acting through the comparatively short and rigid intervening arc of the work piece. The idler wheel 34 is then of course called upon to resist a portion of the thrust of the grinding wheel on the work to insure that the work does not rock about its line of contact with one of its supports.

The spring pressed idler wheel 34 which has self-aligning properties presses the work constantly towards the other wheels. It also performs the important function of damping out any tendency of the work or work-wall to vibrate while being ground. The pressure reaction of this wheel and more especially of the grinding wheel and the control or backing wheel 30 against the work causes controlled rotation of the work when the backing wheel is revolved. This establishes for the work the speed of revolution ordinarily obtained through a revolving headstock and chuck combination. The wheel 30, in the organization above described, performs the functions of a "regulating wheel" as it is known in the art, in respect of controlling the work piece so that it rotates at a constant and uniform rate whereby to subject the work piece bore to the cutting or abrading action of the more rapidly rotating grinding wheel 14. Said wheel 30 and idler wheel 32 (the latter being appropriately and adjustably spaced from the wheel 30 as above described), cooperate to form, in effect a V-shaped throat or trough wherein the work piece is gravitationally seated and which thereby determines the axis of rotation of the work piece from the tangential contact of the latter's preformed external surface with these two throat-forming members. The grinding wheel, or other cutting tool, is preferably fed but the work and its supporting wheels can be fed instead. The rigidity of support against the wall of a thin sleeve due to the mass and stiffness of the backing wheel assembly also serves to minimize chatter and is conducive to a fine finish and accuracy. The pressure of the grinding wheel increases the controlling effect of an opposed regulating wheel in proportion to grinding pressure and also serves to align the work with the accurate face of the backing wheel whether this be a regulating wheel or idler, to further insure accuracy of the wall dimension. Heat generated during grinding is dissipated rapidly when both the inside and the outside of the work are thus open to access of air or cooling liquid and liquid is more easily supplied and grit more easily washed off. Temperature variations in grinding operations using chucks cause loss of time and accuracy which are herein avoided. The work is open and unobstructed at both ends and has only a constantly changing line contact with its supporting means thereby facilitating cooling and increasing cutting speed. It is also very easy to insert or remove a work-piece, even without stopping or interrupting in any way the operation of the work-rotating mechanism; that is to say, upon the completion of the grinding operation on a given work piece and upon the withdrawal therefrom of the grinding wheel 14, it is only necessary for the operator, after his depression of the handle 132 withdraws the upper wheel 34 from the work piece, to reach in and lift the finished work piece from the machine,—replacing it instantly by dropping an unground work piece into the work-positioning throat formed by the two wheels 30 and 32, after which the handle 132 can be released to restore the wheel 34 to its operative position. Such unloading and loading of the work pieces requires no stoppage or interruption of the work-rotating mechanism, and since the movements of withdrawal and insertion are lateral movements rather than axial movements, all danger of exposing the operator's hands to the rotating grinding wheel is entirely averted. Furthermore, no particular skill is required in centering the piece because it can occupy only one position, thus eliminating an error inherently present in all chucks. Also, a piece which is found to need more grinding can be put back accurately in its previous position. The grinding wheel rotates at usual grinding speed and the control or backing wheel turns at a much slower speed in either direction,—a speed comparable to that usually produced by a chuck, for example. Although only one of the work engaging wheels needs to be positively rotated, it is to be understood that any one or more of them may be so rotated if conditions render it desirable. If the wheel 30 is not driven, it still has the important function of furnishing a backing for the work and aids the grinding or other cutting tool in sizing the work.

Another important application of the invention is to face or spot grinding, that is, to grind the end face of the work square with the outside diameter. The grinding wheel may be a cupped or ring wheel which, for such grinding, is fed against the end face of the work while the work is supported and rotated by the other wheels, one of the flanges 36 resisting the thrust of the grinding wheel and the other flange 36 being omitted, if desired.

I claim:

1. An internal grinder, including a grinding wheel for internal engagement with a work piece, a member frictionally engaging the exterior of the work piece in opposition to the grinding wheel for urging the work piece into engagement with the grinding wheel, means for rotating the friction engaging member to impart a constant and uniform rotating movement to the work piece, and means for defininitely varying the separation of the friction member and the grinding wheel to control the amount of stock internally removed from the work piece.

2. An internal grinder including a grinding wheel for internal engagement with a work piece, a member frictionally engaging the exterior of the work piece in opposition to the grinding wheel for urging the work piece into engagement with the grinding wheel, means for rotating the friction engaging member to impart a constant and uniform rotating movement to the work, means for maintaining the work piece in a substantially constant rolling relation to said friction engaging member, and means for definitely varying the separation of the friction member and the grinding wheel to control the amount of stock internally removed from the work piece.

3. An internal grinder, including a grinding wheel for internal engagement with a tubular work piece, a member frictionally engaging the exterior of the work piece in substantial opposition to the grinding wheel for urging the work piece into engagement with the grinding wheel, means for rotating the friction-engaging member to impart a constant and uniform rotating movement to the work piece, another member for engagement with the exterior of the work piece and so spaced from the first member as to form therewith, in effect, a substantially V-shaped throat or trough wherein the work piece is gravitationally seated, and which thereby determines the axis of such rotating movement of the work piece, and means for definitely varying the separation of the friction member and the grinding wheel to control the amount of stock internally removed from the work piece.

4. An internal grinder, including a grinding wheel for internal engagement with a tubular work piece, a member frictionally engaging the exterior of the work piece in substantial opposition to the grinding wheel for backing up the work piece during the grinding action, a second member for frictional engagement with the exterior of the work piece and so spaced from the first member as to form therewith, in effect, a V-shaped throat or trough wherein the work piece is gravitationally seated, means for rotating one of said members to impart to the work piece a constant and uniform rotating movement on the axis determined by the latter's exterior tangential contact with said two members, and means for definitely varying the separation of the grinding wheel from the first member to control the amount of stock internally removed from the work piece.

5. A machine for the precision production of rings, tubes and the like of accurately controlled wall thickness comprising a normally fixed and unyielding work support, a second work support comprising a regulating wheel spaced from the first work support, having its axis normally fixed and presenting an unyielding peripheral surface for engagement with the work, said work supports frictionally engaging and supporting the work between them and constituting the sole support for the work and each being arranged to have line contact with the outer periphery of the work whereby the position of the work axis is determined solely by its engagement with said supports, a rotatable cutting tool arranged to engage the interior of a hollow work piece when in position on said supports, said tool being held substantially unyieldingly in operative engagement with the work and being arranged with its work engaging face in opposed relation to one of said work supports so that said support backs up the work during the cutting operation, means for rotating the rotatable cutting tool, said regulating wheel being arranged to control rotation of the work so that the work rotates at a different rate of speed than the cutting tool to produce cutting action, and means for relatively shifting the tool and the work to produce cutting engagement of the tool with the work.

6. A machine for the precision production of rings, tubes and the like comprising a pair of normally fixed and unyielding work positioning means spaced apart to form a V-shaped throat or trough wherein the work piece is gravitationally seated in stable equilibrium, said positioning means each having frictional line contact with the outer periphery of the work and together constituting the sole support for the work, a rotatable grinding wheel arranged to engage the interior of a hollow work piece when in position on said supports, said wheel being held unyieldingly in operative engagement with the work, one of said work positioning means being arranged to back up the work during the grinding action, means for rotating the grinding wheel, means for rotating the work solely by frictional engagement with the exterior surface thereof so as to impart a substantially constant and uniform rotating movement thereto comprising a driven wheel serving also as one of said work positioning means.

7. A grinding machine for precision production of rings, tubes or the like of uniform wall thickness, including a work support for engagement with the peripheral surface of the work piece, a regulating wheel disposed adjacent the work support and rotatable at a slow work controlling rate of speed to determine the rate of circumferential movement of the work on the work support, a grinding wheel projectable within the work for engagement with the inner surface of the work piece, means supporting the grinding wheel in substantial opposition to the regulating wheel for direct inclusion of the wall of the work piece therebetween, and means for determining the separation of the opposed operative surfaces of the grinding and regulating wheels to control the final thickness of wall of the finished work piece.

8. In a precision machine for grinding the inner wall of a hollow work-piece to produce uniform wall thickness, a backing member engaging the outer periphery of the work-piece and furnishing a solid and unyieldable backing for the work-piece, means engaging the outer periphery of the work-piece and holding the work-piece in a substantially constant relation to the backing member, means to cause rotation of the work-piece, a grinding wheel engaging the inner wall of the work-piece substantially in opposition to the backing member, and means for causing the grinding wheel and the backing member to have a positively controlled relative feeding movement of approach to determine the wall thickness.

9. In a precision machine for grinding the inner wall of a hollow work-piece, a backing wheel and a supporting wheel having rolling engagement with the outer periphery of the work-piece, means to hold the work-piece firmly in contact with the wheels, one of the wheels being rotatably driven to frictionally control rotation of the work piece, a grinding wheel engaging the inner wall of the work-piece, and means to cause the grinding wheel and the backing wheel to have a positively controlled relative movement of approach to determine the wall thickness.

10. An internal grinder including a grinding wheel for internal engagement with a work piece, a member frictionally engaging the exterior of the work piece in opposition to the grinding wheel for urging the work piece into engagement with the grinding wheel, means for rotating the friction engaging member to impart a constant and uniform rotating movement to the work piece, means for definitely varying the separation of the friction member and the grinding wheel to control the amount of stock internally removed from the work piece, and means for urging the work piece in the direction of the friction member.

11. An internal grinder including a grinding wheel for internal engagement with a work piece, a work support frictionally engaging the exterior of the work piece, a member frictionally engaging the exterior of the work piece at a point angularly spaced from the work support in opposition to the grinding wheel for urging the work piece into engagement with the grinding wheel, means for rotating the friction engaging member to impart a constant and uniform rotating movement to the work piece, means for definitely varying the separation of the friction member and the grinding wheel to control the amount of stock internally removed from the work piece, and means for urging the work piece in the direction of the friction member.

12. A grinding machine for precision generation of an inner surface of revolution of a tubular work piece, including a work support, a regulating wheel spaced therefrom, said parts being disposed to engage the outer periphery of a work piece at circumferentially spaced points and providing a throat for reception of said work piece, a grinding member projecting intermediate said parts for internal engagement with a work piece supported thereby, and additional means for urging a work piece in the direction of the regulating wheel.

13. An internal grinder, including a grinding wheel for internal engagement with a tubular work piece, a member frictionally engaging the exterior of the work piece in position to back up the work during the grinding action, means for rotating the friction-engaging member to impart a constant and uniform rotating movement to the work piece, another member for engagement with the exterior of the work piece and so spaced from the first member as to form therewith, in effect, a substantially V-shaped throat or trough wherein the work piece is gravitationally seated, and which thereby determines the axis of such rotating movement of the work piece, means for definitely varying the separation of the friction member and the grinding wheel to control the amount of stock internally removed from the work piece, and means pressing on said work piece to maintain the same in contact with said throat-forming members.

14. An internal grinder, including a grinding wheel for internal engagement with a tubular work piece, a member frictionally engaging the exterior of the work piece in position to back up the work piece during the grinding action, a second member for frictional engagement with the exterior of the work piece and so spaced from the first member as to form therewith, in effect, a V-shaped throat or trough wherein the work piece is gravitationally seated, means for rotating one of said members to impart to the work piece a constant and uniform rotating movement on an axis determined by the latter's exterior tangential contact with said two members, means for definitely varying the separation of the grinding wheel from the first member to control the amount of stock internally removed from the work piece, and means pressing on said work piece to maintain the same in contact with said throat-forming members.

15. A machine for the precision production of rings, tubes and the like comprising a normally fixed and unyielding work support, a second work support comprising a regulating wheel spaced from the first work support, having its axis normally fixed and presenting an unyielding peripheral surface for engagement with the work, said work supports frictionally engaging and supporting the work between them and constituting the sole support for the work and each being arranged to have line contact with the outer periphery of the work whereby the position of the work axis is determined solely by its engagement with said supports, means frictionally engaging the outer periphery of the work for urging a work piece in the direction of the work supports, a rotatable cutting tool arranged to engage the interior of a hollow work piece when in position on said supports, said tool being held substantially unyieldingly in operative engagement with the work, means for rotating the rotatable cutting tool, means for rotating the regulating wheel to impart a constant and uniform rotating movement to the work piece by frictional engagement of the regulating wheel therewith, and means for relatively shifting the tool and the work to produce cutting engagement of the tool with the work.

16. A machine for the precision production of rings, tubes and the like comprising a pair of spaced, normally fixed and unyielding work positioning means frictionally engaging and supporting the work between them and constituting the sole support for the work, each of said supports being arranged to have line contact with the outer periphery of the work whereby the position of the work axis is determined solely by its engagement with said supports, a rotatable cutting tool arranged to engage the interior of a hollow work piece when in position on said supports, said tool being held substantially unyieldingly in operative engagement with the work and being arranged with its work engaging face in opposed relation to one of said supports so that said support backs up the work during the cutting operation, means for rotating the cutting tool, additional work positioning means frictionally engaging the outer periphery of the work and urging the work toward the work supports, one of said positioning means comprising a regulating wheel, said regulating wheel being arranged to control rotation of the work so that the latter rotates at a different rate of speed than the cutting tool to produce cutting action, and means for relatively shifting the tool and the work to produce cutting engagement of the tool with the work.

17. A machine for the precision production of rings, tubes and the like comprising a pair of spaced, normally fixed and unyielding work positioning means frictionally engaging and supporting the work between them and constituting the sole support for the work, each of said supports being arranged to have line contact with the outer periphery of the work whereby the position of the work axis is determined solely by its engagement with said supports, a rotatable cutting tool arranged to engage the interior of a hollow work piece when in position on said supports, said tool being held substantially unyieldingly in operative engagement with the work, means for rotating the cutting tool, additional work positioning means frictionally engaging the outer periphery of the work and urging the work toward the work supports, one of said positioning means comprising a regulating wheel, means for driving the regulating wheel to thereby impart a constant and uniform rotating movement to the work piece, and means for relatively shifting the tool and the work to produce cutting engagement of the tool with the work.

18. A machine for the precision production of rings, tubes and the like comprising a pair of normally fixed and unyielding work-positioning means spaced apart to form a V-shaped throat or trough wherein the work piece is gravitationally seated in stable equilibrium, said positioning means each having frictional line contact with the outer periphery of the work and together constituting the sole support for the work, a rotatable grinding wheel arranged to engage the interior of a hollow work piece when in position on said supports, said wheel being held unyieldingly in operative engagement with the work, additional work positioning means frictionally engaging the outer periphery of the work and urging it toward the work supports, one of said positioning means being arranged to back up the work during the grinding action, means for rotating the grinding wheel, means for rotating the work solely by frictional engagement with the exterior surface thereof so as to impart a substantially constant and uniform rotating movement thereto comprising a driven wheel serving also as one of said work positioning means.

19. In the combination as defined in claim 18 said additional work positioning means being mounted for bodily shifting movement out of the way of the work to facilitate loading and unloading.

20. A precision grinding machine for the production of tubular work pieces of uniform wall thickness comprising a rotary member having a non-yielding surface interiorly engaging the wall of the work piece, a second member having a non-yielding surface exteriorly engaging the wall of the work piece and disposed in cooperative opposition to the first member, the surface of one of said members being of abrasive material, means for imparting movement to said abrasive surface at a grinding rate to cause proper stock removal, means for advancing the surface of the other member at a work-regulating rate of speed to control the rate of presentation of the surface to be ground to the grinding member, a work rest carried by the machine and positioned to engage one of the cylindrical surfaces of the work to cooperate with the work regulating member in controlling the position of the work piece during grinding, and means for accurately controlling the distance between the operative surfaces of said members to determine the final wall thickness.

21. A machine for precision grinding of the interior surface of a ring, tube or the like including a work rest adapted to engage the outer surface of the article and support the same for free rotation upon said surface, and an opposed regulating wheel having its operative surface moving in the direction of said work rest, said regulating wheel being disposed to engage the outer surface of the work piece and control the rotative movement of the work on the work rest, a grinding member disposed intermediate said wheel and rest for internal engagement with the work piece, and means for relatively shifting the regulating wheel and the grinding member to bring the grinding member and the work into operative engagement.

22. An internal grinder including a work rest and an opposed regulating wheel having its operative surface moving in the direction of said work rest, a grinding member disposed intermediate said wheel and rest for internal engagement with the work piece, means for relatively shifting the regulating wheel and the grinding member to bring the grinding member and work into operative engagement, and means for reciprocating the grinding wheel and work one relative to the other during the grinding operation.

23. An internal grinder including a work rest and an opposed regulating wheel having its operative surface moving in the direction of said work rest, a grinding member disposed intermediate said wheel and rest for internal engagement with the work piece, means for relatively shifting the regulating wheel and the grinding member to bring the grinding member and work into operative engagement, means for reciprocating the grinding wheel and work one relative to the other during the grinding operation, and means for relatively axially separating the grinding wheel and the work at the completion of said operation.

24. An internal grinder including a work rest and an opposed regulating wheel forming a work receiving throat for exterior engagement with the peripheral surface of a ring, tube or the like, a grinding wheel disposed in spaced relation to the parts forming said throat and in opposition thereto for engagement with the inner surface of the article peripherally supported by said parts, means for varying the relative position of said members to cause operative engagement of the work by the grinding wheel and to release it from engagement therewith, and means for causing the grinding wheel to internally traverse the work while the parts are in grinding relation.

25. An internal grinder, including spaced members providing a work receiving throat for exterior engagement with a work piece, means for rotating one of said members to frictionally impart a rotating movement to the work piece, a grinding member projecting into the throat for internal engagement with a work piece supported therein, and means for imparting relative lateral movement to the grinding member and one of the throat forming members to operatively associate the work and grinding member.

26. A machine for precision generation of the inner surface of a ring, tube or the like in prescribed relation to the outer peripheral surface thereof, including opposed grinding and regulating wheels for engagement respectively internally and exteriorly with a work piece, a work support for exteriorly engaging the work piece and steadying same during the grinding thereof disposed in fixed relation to one of said wheels, and means for relatively shifting the other of said wheels and the work support during the grinding operation to operatively associate the grinding wheel and work.

27. A grinder for the formation of an internal cylindrical surface in definite relation to a preformed exterior surface of a work piece comprising bearing members for engaging the preformed exterior surface to position the work thereby, said bearing members including a work rest and a regulating wheel spaced therefrom to provide a work receiving trough, means for rotating the regulating wheel at a slow rate of speed to impart a constant and uniform rotation to a work piece within the trough, a grinding member for internal engagement with the work piece, and means for shifting the exterior and interior work engaging members one relative to the other to bring the operative surface of the grinding member into proper relation to the arc of the preformed exterior surface of the work as positioned by the exterior bearing members whereby the grinding wheel will reduce the work to a uniform wall thickness.

28. A precision grinding machine for the formation of a cylindrical internal surface accurately concentric with the cylindrical outer surface of a work piece comprising a work rest and a rotary regulating wheel of sufficient rigidity to resist surface yield under normal grinding pressure, said parts forming a two point bearing for the exterior face of the work piece and definitely determining the position of the included arc of a work piece surface in engagement therewith, means for rotating said regulating wheel at a slow and uniform rate to frictionally impart constant and uniform rotation to a work piece in engagement therewith, a grinding wheel projectable into the bore of a work piece supported on said two point bearing at a point to engage the aforesaid included arc of the work piece, and means for shifting said grinding and regulating wheels one relative to the other whereby the determined position of the exterior arc of the work piece will be brought into predetermined relation to the operative portion of the grinding wheel to control the thickness of wall of work piece produced by action of the grinding wheel on the interior thereof.

29. In a machine of the character indicated, the combination with a work-support comprising a rotatable supporting-member and a regulating-wheel angularly spaced from each other and adapted to have the periphery of a work-piece resting upon them, said support being free from means clamping the work-piece radially, of means for rotating said regulating-wheel, a work-altering-wheel adapted to engage the interior of the work-piece and having its axis in the line defined by the axis of said regulating-wheel and the point of engagement between said regulating-wheel and the work-piece, and means for holding said work-altering-wheel in a definite spaced relation to said regulating-wheel.

30. A grinding machine for the precision generation of the inner surface of a ring, tube or the like in definite prescribed relation to the outer surface of the member, including a regulating wheel rotatable at a slow work controlling rate of speed for frictional engagement with the outer surface of the work piece to control the rate of rotation thereof, an internal grinding wheel rotatable at a high grinding rate of speed for engagement with the inner surface of the article, means supporting the parts in opposition one to the other whereby the grinding and regulating wheels contact with the work along the same axial plane thereof in opposition one to the other, and additional means for exteriorly engaging the periphery of the work piece and steadying the same during the grinding thereof.

31. In a device of the character indicated, a supporting idler wheel having a portion upon and above which the work-piece is adapted to rest, said portion being to one side of the center of gravity of the work-piece, a second supporting-wheel upon the other side of said center of gravity and having its work-engaging portion in the zone whose top is defined by the horizontal diameter of the work-piece, means for rotating said second wheel in the direction to cause rotation of the work-piece toward said idler, a circular tool engaging the interior of said work-piece substantially in the line that connects the work-center and the center of said second wheel, and means for rotating said tool in the direction tending to press the work-piece upon said idler.

32. An internal grinder including a pair of work supporting members arranged to form a work receiving trough for peripheral engagement with a work piece gravitationally urged into frictional engagement therewith, means for imparting a rotary movement to one of said members to cause rotation of a work piece when inserted in the trough, a grinding wheel mounted for engagement in the bore of a tubular work piece when the same is supported in the trough, and means for shifting the work and grinding member one relative to the other to gradually bring the grinding member into operative engagement with the prerotated work whereby injury of the work surface on initial engagement of the grinding wheel and work is prevented.

33. A machine for precision grinding of the interior of a tubular work piece comprising a bed, a carriage slidably supported by the bed, a grinding wheel spindle mounted on the carriage and including an overhanging grinding wheel rotatable at a high grinding rate of speed for engagement with the interior of the work piece, means supported by the bed and disposed on opposite sides of the axis of the grinding wheel to support a work piece in operative relation to said wheel, said means including a work rest for engagement with the periphery of the work piece and an opposed non-yielding regulating wheel rotatable at a slow rate of speed and in the direction of the work rest for frictional peripheral engagement with a work piece to control the rate of rotation thereof, means for effecting radial adjustment of the grinding and regulating wheels one with respect to the other, and additional means for imparting a radial feeding movement of the parts one with respect to the other to vary their operative relation for a given adjustment of the parts.

34. A machine for precision grinding of the interior of a tubular work piece comprising a bed, a carriage slidably supported by the bed, a grinding wheel spindle mounted on the carriage and including an overhanging grinding wheel rotatable at a high grinding rate of speed for engagement with the interior of the work piece, means supported by the bed and disposed on opposite sides of the axis of the grinding wheel to support a work piece in operative relation to said wheel, said means including a work rest for engagement with the periphery of the work piece and an opposed non-yielding regulating wheel rotatable at a slow rate of speed and in the direction of the work rest for frictional peripheral engagement with a work piece to control the rate of rotation thereof, means for effecting radial adjustment of the grinding and regulating wheels one with respect to the other, additional means for imparting a radial feeding movement of the parts one with respect to the other to vary their operative relation for a given adjustment of the parts, and means for producing axial traversing movement between the work and grinding wheels when the parts are in operative engagement.

35. A machine for precision grinding of the interior of a tubular work piece comprising a bed, a carriage slidably supported by the bed, a grinding wheel spindle mounted on the carriage and including an overhanging grinding wheel rotatable at a high grinding rate of speed for engagement with the interior of the work piece, means supported by the bed and disposed on opposite sides of the axis of the grinding wheel to support a work piece in operative relation to said wheel, said means including a work rest for engagement with the periphery of the work piece and an opposed non-yielding regulating wheel rotatable at a slow rate of speed and in the direction of the work rest for frictional peripheral engagement with a work piece to control the rate of rotation thereof, means for effecting radial adjustment of the grinding and regulating wheels one with respect to the other, additional means for imparting a radial feeding movement of the parts one with respect to the other to vary their operative relation for a given adjustment of the parts, and means for producing axial traversing movement between the work and grinding wheels when the parts are in operative engagement and for effecting axial disengagement of the work and grinding wheels.

36. In a precision cutting machine, a rotatable wheel having peripheral contact with a round work-piece, a cutting tool for engagement with the work-piece, a second rotatable wheel for supporting the work-piece and having spaced ribs elevated above the body of the wheel for peripheral contact with the work-piece, and one of the wheels having flanges engaging the ends of the work-piece to hold it from endwise movement with respect to the wheels.

37. In a machine of the character described, a rotatable wheel having peripheral contact with a round work-piece, a second wheel for peripheral contact with the work-piece and having its axis in a plane with the axis of the first wheel, a tool, and a self-aligning rotatable wheel for engaging a work-piece supported by said other wheels.

38. In a machine of the character described, a pair of wheels having their axes in the same plane and having peripheral contact with a round work-piece, the points of contact of the wheels with the work having a definite angular spacing, a rotary tool for operating on the work-piece, a slidable support for one of said wheels, and means for adjusting said support to maintain the angular spacing of said points of contact for work-pieces of any diameter.

39. In a machine of the character described, a rotatable wheel having peripheral contact with a round work-piece, a second wheel in peripheral and supporting contact with the work-piece, a grinding wheel for engaging the work-piece in a plane including the axis of the first wheel and the axis of the work-piece, and means for adjusting the second wheel to move its axis in a plane at an angle to said first plane to hold work-pieces of different size with their centers in said first plane.

40. In a machine of the character described, two supporting-members for engaging a work-piece, and a tool for operating upon the work-piece, the point of engagement between the tool and the work-piece being in the plane defined by the axis of the work-piece and the line of engagement of the work-piece by one of said supporting-members, and the other said supporting member being adjustable along a line at that angle to said plane that is half the supplement of the angle included between the points of contact of said supporting-members with the work-piece.

41. In a machine of the character indicated, a wheel having peripheral contact with a round work-piece, a second wheel having peripheral contact with the work-piece, the axes of the wheels being in a common plane, a rotary tool for operating on the work-piece and having its axis in a plane including the center of the work-piece and the axis of one of the wheels, a slidable support for one of said wheels, and means for moving said support at an angle to said last mentioned plane, said angle being half the supplement of the angle included between the points of contact of the wheels with the work-piece, to support work-pieces of any diameter in the same location with respect to the wheels and the tool.

42. In a machine of the character described, a wheel having peripheral contact with a round work-piece, a second wheel having peripheral contact with the work-piece, the axes of the wheels being in a common plane, a rotary tool for operating on the work-piece and having its axis in the plane of the axis of one of the wheels, a slidable support for one of said wheels, and means for moving said support at an angle to said plane, said angle being half the supplement of the angle included between the points of contact of the wheels with the work-piece, to support work-pieces of any diameter in the same location with respect to the wheels and the tool.

43. In a machine of the character described, a backing wheel having peripheral contact with a round work-piece, a work supporting wheel having its axis in a plane with the axis of the backing wheel, a rotary tool having its axis in a plane with the axis of the backing wheel, a support for the supporting wheel movable at an angle to a plane through the axis of the backing wheel and the axis of the rotary tool, and a movable support for the backing wheel for adjusting the axis of the backing wheel in said plane.

44. The process of producing a hollow article of uniform wall thickness consisting in initially forming a surface of revolution on the exterior thereof, supporting the work piece for rotation on said preformed outer surface, rotating the work piece and generating a second surface thereon in constant relation to said supporting surface during such rotation.

45. The process of producing a tubular work piece of uniform wall thickness consisting in initially generating a true cylindrical surface of revolution on the work piece and subsequently engaging said surface by a regulating wheel and progressively advancing the wall between said regulating wheel and a grinding wheel in a predetermined spaced relation thereto to generate a second surface on the work in predetermined relation to the first.

46. The process of producing a tubular work piece of uniform wall thickness consisting in floating the work piece between spaced abrasive wheels respectively engaging the interior and exterior faces thereof, and operating one of said wheels at a rapid rate to remove by grinding the excess of stock over a predetermined work thickness while rotating the other wheel at a slow rate to control the presentation of the work to the grinding wheel.

47. The process of producing a tubular work piece of uniform wall thickness consisting in rotating a work piece having one previously finished surface between rigid abrasive members respectively engaging the interior and exterior surfaces thereof, and removing excess stock with one of said wheels while controlling the movement of the work with another of the wheels.

JAMES F. WILLIAMS.